US005488879A

United States Patent [19]

Larsen et al.

[11] Patent Number: 5,488,879
[45] Date of Patent: Feb. 6, 1996

[54] PASSIVE OVERLOAD DISCONNECT MECHANISM FOR ACTUATION SYSTEMS

[75] Inventors: Richard K. Larsen, Lahambra; William W. Fellows, Van Nuys, both of Calif.

[73] Assignee: AlliedSignal, Inc., Morristown, N.J.

[21] Appl. No.: 269,417

[22] Filed: Jun. 30, 1994

[51] Int. Cl.⁶ .................................................. F16H 1/06
[52] U.S. Cl. .................................................. 74/412 TA
[58] Field of Search ........................ 74/405, 406, 412 TA

[56] References Cited

U.S. PATENT DOCUMENTS 4,318,304  3/1982  Lang ........................................ 74/89.15
4,373,924  2/1983  Schuhmacher ............................ 464/38
4,459,867  7/1984  Jones ...................................... 74/89.15
4,928,802  5/1990  Weiss et al. ............................ 192/59 R Primary Examiner—Dirk Wright
Attorney, Agent, or Firm—John R. Rafter

[57] ABSTRACT

A passive disconnection mechanism for use in a multiple-motor actuation system. The mechanism disengages a failed motor from the remainder of the system to preserve system operability.

14 Claims, 4 Drawing Sheets

PASSIVE OVERLOAD DISCONNECT MECHANISM FOR ACTUATION SYSTEMS

TECHNICAL FIELD

The present invention relates generally to actuation systems for aircraft and spacecraft, and more specifically to those which, for safety reasons, incorporate redundant motors in their design.

BACKGROUND OF THE INVENTION

In aerospace applications it is often necessary to provide redundancy in the design of actuation systems. Such designs employ a fail-safe approach to addressing possibilities that, if not addressed, could result in loss of flight control capability. Thus, a thrust vectoring system may be driven by four motors when only two are needed, or a control surface of an aircraft may be adjusted by a combination of motors, where the combination will not be rendered inoperable when one of the motors fails.

Despite the provision of redundancy in design, problems may still arise depending on the failure mode of a failed motor. If the motor fails in an open mode, the remainder of the actuation system is typically sufficient to provide continued control capability. However, if the motor fails in a locked mode, its continued connection to the remainder of the actuation system may render the entire system inoperable.

An object of the present invention is to provide an actuation system with a passive means for disconnecting a failed motor from the remainder of the system in a manner which preserves system operability. Further objects and advantages of the invention may become apparent from the following description, which includes the appended claims and accompanying drawings.

SUMMARY OF THE INVENTION

The invention provides an actuation system with a passive disconnection mechanism which preserves system operability by passively disconnecting a failed motor from the remainder of the system.

The mechanism comprises a first structural member, the first member forming a set of spaced projections and a set of spaced slots spacing the projections in juxtaposed relation thereto; a main gear supported by the member for rotational movement relative thereto; a secondary gear; a second structural member supporting the secondary gear for rotational movement relative thereto, the second member forming a second set of spaced projections and a second set of spaced slots spacing the projections of the second set in juxtaposed relation thereto, the second member being connected relative to the first member such that the first set of slots and projections generally faces the second set of slots and projections, and such that the second member is movable relative to the first member to alternatively engage the second set of slots and projections with the first set of slots and projections or to align the slots and projections of the first set with the slots and projections of the second set, respectively.

DESCRIPTION OF THE PREFERRED EMBODIMENT

Figure 1:
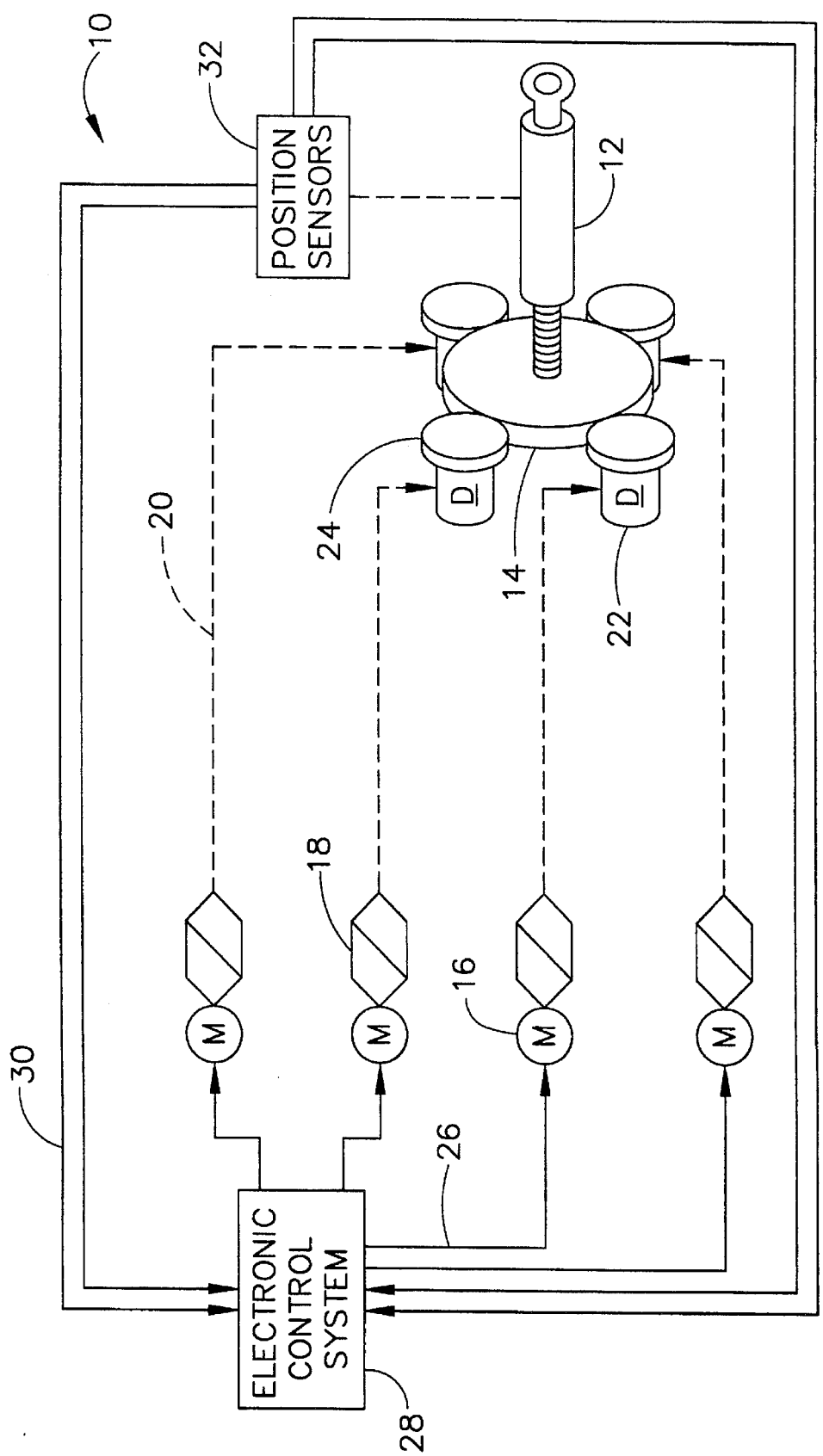
FIG. 1 is a schematic drawing of an actuation system incorporating quad-motor redundancy in an aerospace application.

FIG. 1 schematically depicts an actuation system 10 incorporating the invention. An actuation shaft 12 in the form of a ballscrew regulates the position of a rocket nozzle (not shown) with which it is connected in driving relation. The opposite end of the shaft 12 is connected in driven relation to a main gear 14. The main gear 14 is driven by four electric motors (as at 16) through respective gearboxes (as at 18). Each gearbox 18 is connected (as signified by dashed lines 20) in driving relation to a respective disconnect mechanism (as at 22). Each disconnect mechanism 22 is comprised of a secondary gear (as at 24) which is normally engaged with the main gear 14. In use of the system 10, current produced by a turboalternator (not shown) is delivered along lines (as at 26) to each motor 16 as determined by an electronic control system 28 (ECS). The ECS enables the appropriate current to be delivered to the motors 16 in response to a position error signal calculated by comparison of a command signal with a position signal, the latter being redundantly communicated along lines (as at 30) to the ECS by use of conventional position sensors 32.

If any of the four motors 16 fails, the system 10 continues to operate with three motors. The failed motor is either back-driven (if the motor fails open) through its respective gearbox 18 and disconnect mechanism 22, or passively disconnected (if the motor fails in a locked mode) at its respective disconnect mechanism in a manner more particularly described below.

Figure 2:
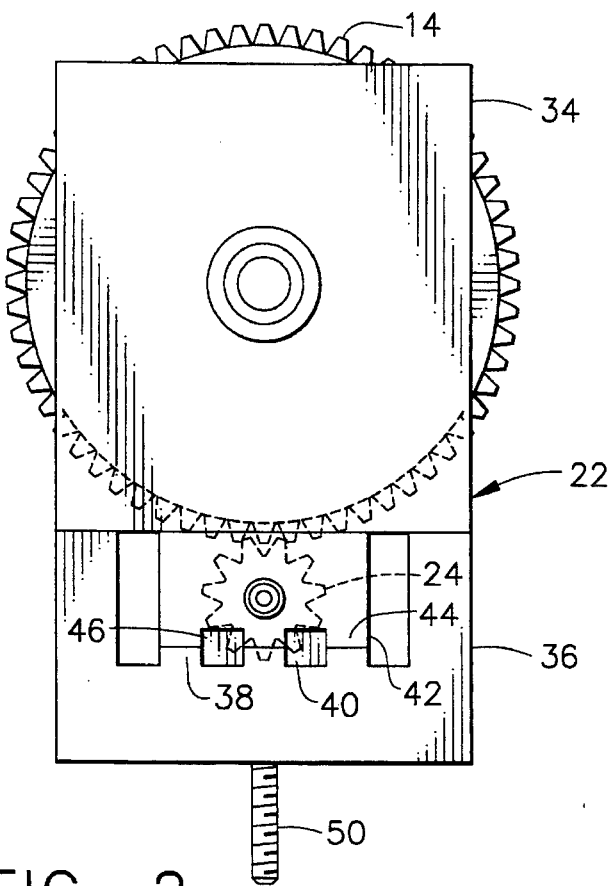
FIG. 2 is a rear elevation of one of the disconnect mechanisms illustrated in FIG. 1, with the gears engaged.
Figure 3:
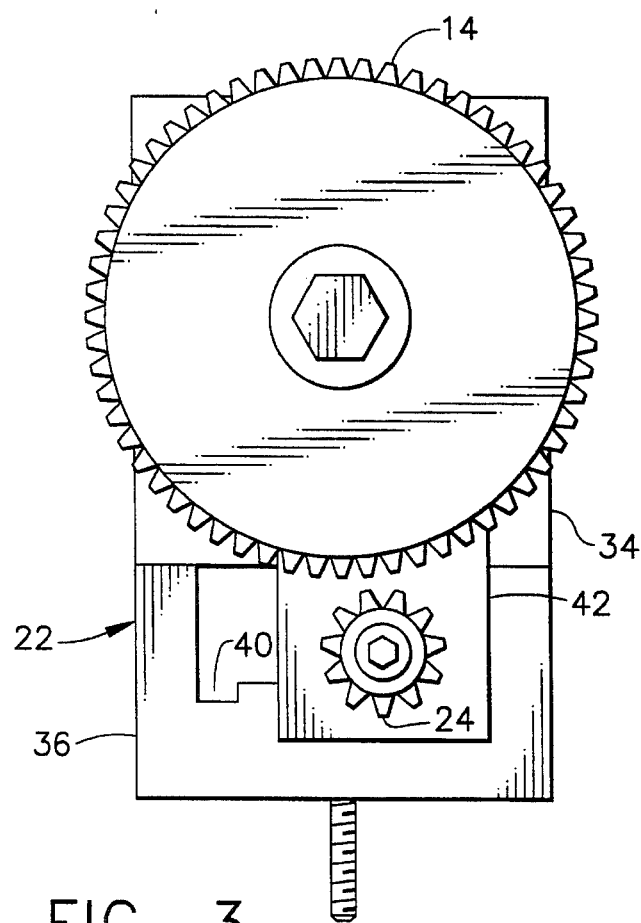
FIG. 3 is a front elevation of the mechanism of FIG. 2, with the gears disengaged.
Figure 4:
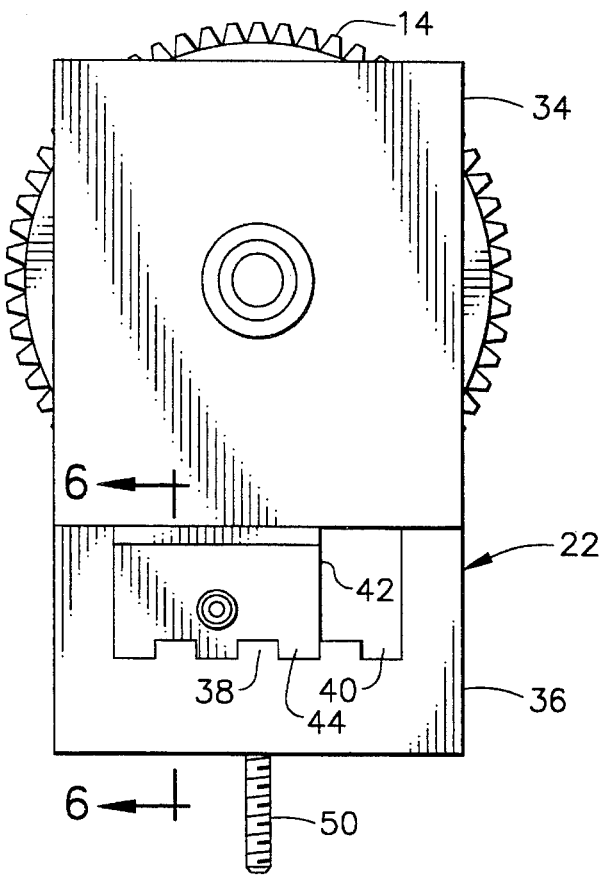
FIG. 4 is a rear elevation of the mechanism of FIG. 2, with the gears disengaged.
Figure 5:
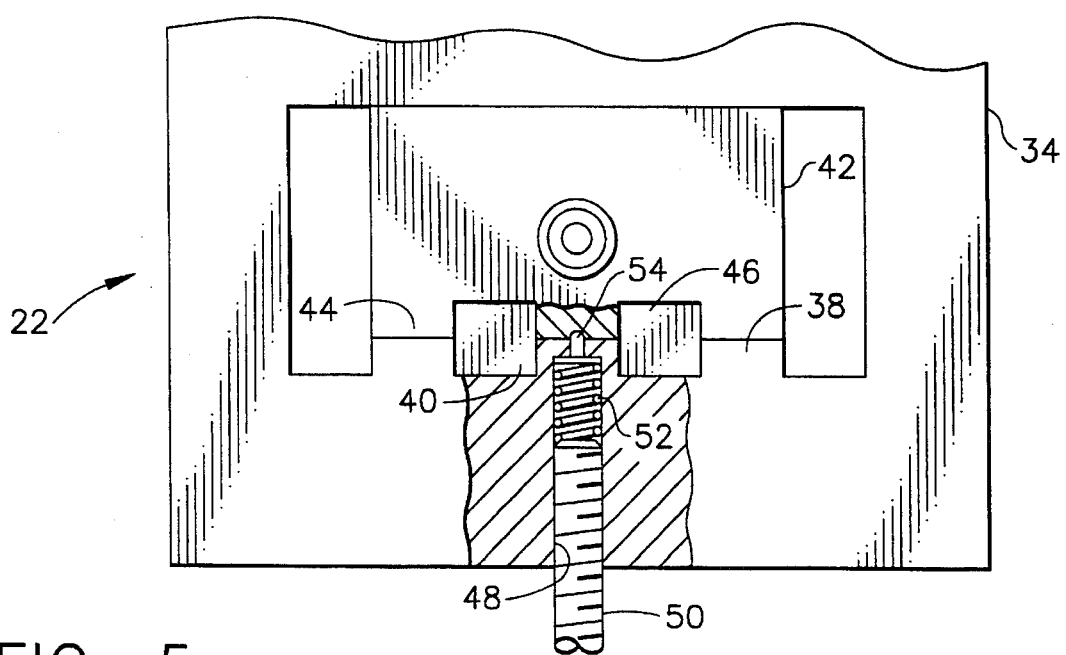
FIG. 5 is a fragmentary rear elevation, partially in cross-section, illustrating a coupling means included in the mechanism of FIG. 2.

The disconnect mechanisms 22 are identical, so a description of one will serve as a description of all. Referring now to FIGS. 2–6, the main gear 14 is shown in combination with one of the disconnect mechanisms 22 and in isolation from the actuation shaft 12 so that the structure and function of the disconnect mechanism can be more clearly described. A first structural member 34, illustrated here in the form of a metal plate, supports the main gear 14 through a conventional bearing (not shown) to permit relative rotational movement of the gear. The secondary gear 24 is shown engaged in driving relation with the main gear 14 in FIG. 2. The secondary gear 24 is connected for rotational movement (via an unillustrated bearing) to a second structural member 36, also illustrated in the form of a metal plate. The second member 36 is connected in fixed positional relation to the first member 34 by any conventional means. Alternatively, the first and second members 34, 36 may be formed as an integral element, as illustrated in FIG. 5. The second member 36 is formed to provide a crenelated portion thereof, thus providing a set of equally spaced projections (as at 38). The projections 38 are spaced by a set of spaced slots (as at 40) in juxtaposed relation to the projections. A third structural member 42 in the form of a metal block supports the secondary gear 24, again via a bearing, so that the gear is rotatable relative thereto. The third member is also formed to provide a crenelated portion, thus providing a set of equally spaced projections (as at 44) which are spaced by a set of spaced slots (as at 46) in juxtaposed relation to the projections. As is illustrated by FIGS. 2 and 7, the projections 44 and slots 46 of the third member 42 are aligned with the projections 38 and slots 40 of the second member 36 when the secondary gear 24 is engaged with the main gear 14. As is illustrated by FIGS. 3 and 4, when the projections and slots of the third member 42 are engaged with the projections and slots of the second member, the secondary gear 24 is disengaged from the main gear 14.

FIG. 5 illustrates how the second and third members 36, 42 are coupled during normal operation of the disconnect mechanism 22. A centrally disposed threaded bore 48 formed through the first member 34 receives an adjustment bolt 50. The bolt 50 compresses a spring 52 that bears against a plunger 54. The plunger 54 is nested in a centrally disposed, conformal slot (unnumbered) formed in the third member 42, thus forming a conventional detent coupling. The force required to decouple the plunger from the slot is adjustable by means of the bolt 50.

Figure 6:
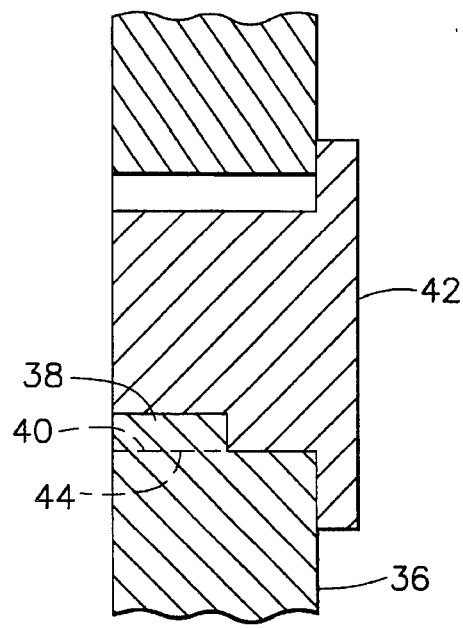
FIG. 6 is a fragmentary cross-section taken along line 6—6 of FIG. 4.
Figure 7:
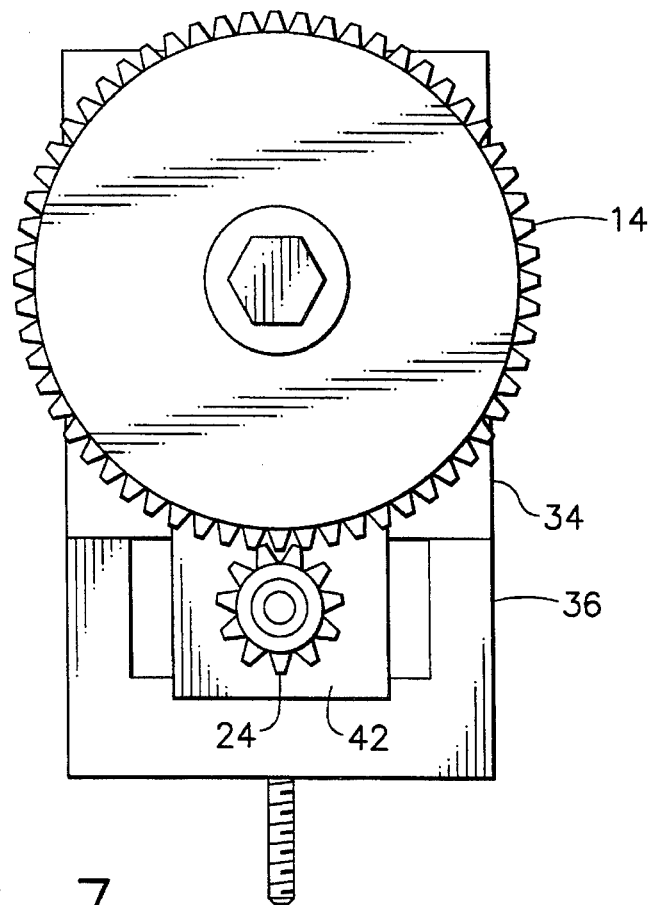
FIG. 7 is a front elevation of the mechanism of FIG. 2.

FIG. 6 is included to further illustrate the structural overlap between the second and third members 36, 42. Such overlap, however, is of no consequence in terms of providing the ability to practice the invention.

In use of the actuation system 10, the secondary gear 24 of each disconnect mechanism 22 is normally driven by the associated motor 16 through the associated gearbox 18. Thus, the motors 16 collectively drive the main gear 14 to which the ballscrew or other control element is connected. If a motor 16 fails in an open (unlocked) mode, the remaining motors continue to drive the main gear 14. in that event, the secondary gear 24 associated with the failed motor is simply back-driven, and the dynamic torque applied to that secondary gear is insufficient to disengage the detent coupling between the associated second and third structural members 36, 42. Upon failure of a motor 16 in a locked position, the remaining motors also continue to drive the main gear 14. However, in that event, the locked condition of the failed motor is transferred to the associated secondary gear 24. Therefore, when the remaining motors drive the main gear 14, the torque transferred from the main gear to the secondary gear 24 associated with the failed motor is converted to linear movement of the associated third structural member 42 relative to the second member 36. Accordingly, the third member 42 is transferred from the position indicated by FIG. 2 (wherein the projections and slots of the second and third members 36, 42 are aligned) to a position at which the projections 44 and slots 46 of the third member are aligned with the slots 40 and projections 38, respectively, of the second member 36, whereupon the third member falls into engagement with the second member as indicated by FIG. 4. Incident to such movement, the secondary gear 24 becomes disengaged from the main gear 14, as indicated in FIG. 3.

The above portion of the description is intended as illustrative, and is not intended to limit the scope of the invention more than is indicated by the following claims

What is claimed is:

1. A passive disconnection mechanism, comprising in combination:

a first structural member;

a main gear supported by the member for rotational movement relative thereto;

a second structural member connected in fixed positional relation to the first member; the second member forming a set of spaced projections and a set of spaced slots spacing the projections in juxtaposed relation thereto;

a secondary gear;

a third structural member supporting the secondary gear for rotational movement relative thereto; the third member forming a second set of spaced projections and a second set of spaced slots spacing the projections of the second set in juxtaposed relation thereto; the third member being connected to the second member such that the first set of slots and projections faces the second set of slots and projections, and such that the second member is movable relative to the third to alternatively engage the second set of slots and projections with the first set of slots and projections or to align the slots and projections of the first set with the slots and projections of the second set, respectively.

2. A mechanism as recited in claim 1 wherein the secondary gear is unengaged with the main gear when the first set of slots and projections is engaged with the second set of slots and projections.

3. A mechanism as recited in claim 2 wherein the secondary gear is engaged with the main gear when the first set of slots and projections is aligned with the second set of slots and projections, respectively.

4. A mechanism as recited in claim 3 further comprising means for coupling the third member and the second member, the coupling means being operative when the main gear is engaged with the secondary gear.

5. A mechanism as recited in claim 4 wherein the coupling means comprises a detent coupling.

6. An actuation system for adjusting a control element of a flight craft, comprising in combination:

a main gear, a first structural member supporting the main gear for rotational movement;

an actuation shaft connected in driven relation to the main gear and in driving relation to the control element;

a plurality of secondary gears engaged with the main gear in driving relation thereto; and for each of the plurality of secondary gears, a disconnection mechanism comprising:

a second structural member connected in fixed positional relation to the first member; the second member forming a set of spaced projections and a set of spaced slots spacing the projections in juxtaposed relation thereto;

a third structural member supporting the secondary gear for rotational movement relative thereto; the third member forming a second set of spaced projections and a second set of spaced slots spacing the projections of the second set in juxtaposed relation thereto; the third member being connected to the second member such that the first set of slots and projections faces the second set of slots and projections, and such that the second member is movable relative to the third to alternatively engage the second set of slots and projections with the first set of slots and projections or to align the slots and projections of the first set with the slots and projections, respectively, of the second set.

7. An actuation system as recited in claim 6 wherein each secondary gear is unengaged with the main gear when its respective first set of slots and projections is engaged with its respective second set of slots and projections.

8. An actuation system as recited in claim 6 wherein each secondary gear is engaged with the main gear when its respective first set of slots and projections is aligned with its respective second set of slots and projections.

9. An actuation system as recited in claim 8 further comprising coupling means for maintaining alignment between the first set of slots and projections and the second set of slots and projections.

10. A passive disconnection mechanism, comprising in combination:
   a first structural member; the first member forming a set of spaced projections and a set of spaced slots spacing the projections in juxtaposed relation thereto;
   a main gear supported by the member for rotational movement relative thereto;
   a secondary gear;
   a second structural member supporting the secondary gear for rotational movement relative thereto; the second member forming a second set of spaced projections and a second set of spaced slots spacing the projections of the second set in juxtaposed relation thereto; the second member being positioned relative to the first member such that the first set of slots and projections generally faces the second set of slots and projections, and such that the second member is movable relative to the first member to alternatively engage the second set of slots and projections with the first set of slots and projections or to align the slots and projections of the first set with the slots and projections of the second set, respectively.

11. A mechanism as recited in claim 10 wherein the secondary gear is unengaged with the main gear when the first set of slots and projections is engaged with the second set of slots and projections.

12. A mechanism as recited in claim 10 wherein the secondary gear is engaged with the main gear when the first set of slots and projections is aligned with the second set of slots and projections, respectively.

13. A mechanism as recited in claim 12 further comprising means for coupling the first member and the second member, the coupling means being operative when the main gear is engaged with the secondary gear.

14. A mechanism as recited in claim 13 wherein the coupling means comprises a detent coupling.

* * * * *